Aug. 2, 1949.  L. A. MAJNERI  2,477,758
MASTER CYLINDER FOR HYDRAULIC BRAKE SYSTEMS
Filed May 21, 1945  2 Sheets-Sheet 1
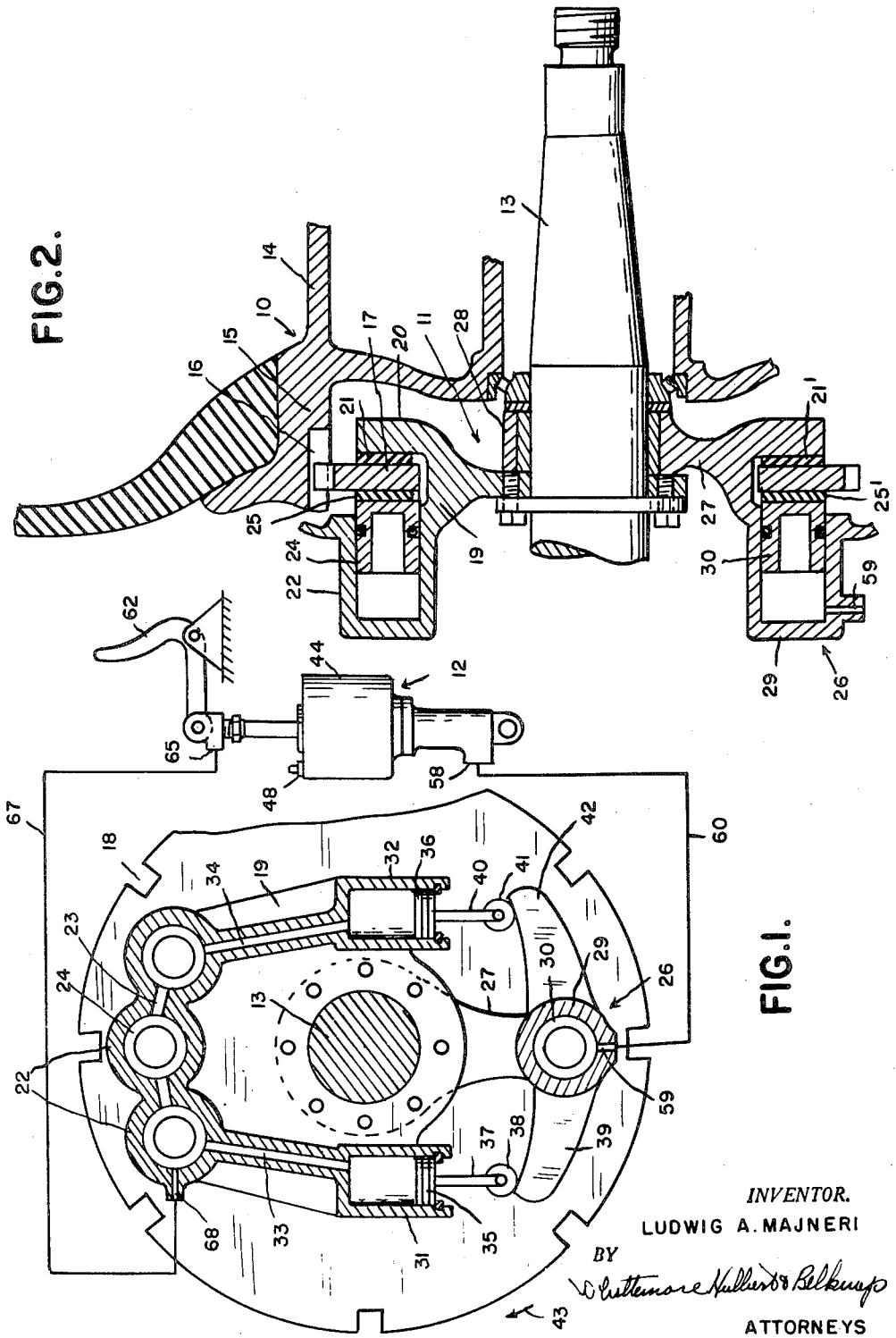
INVENTOR.
LUDWIG A. MAJNERI
BY
ATTORNEYS Aug. 2, 1949.   L. A. MAJNERI   2,477,758
MASTER CYLINDER FOR HYDRAULIC BRAKE SYSTEMS
Filed May 21, 1945   2 Sheets-Sheet 2
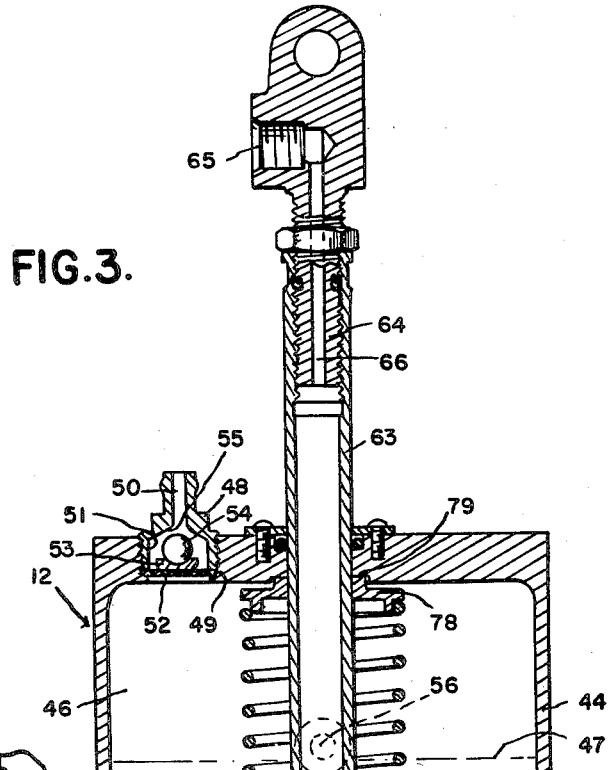
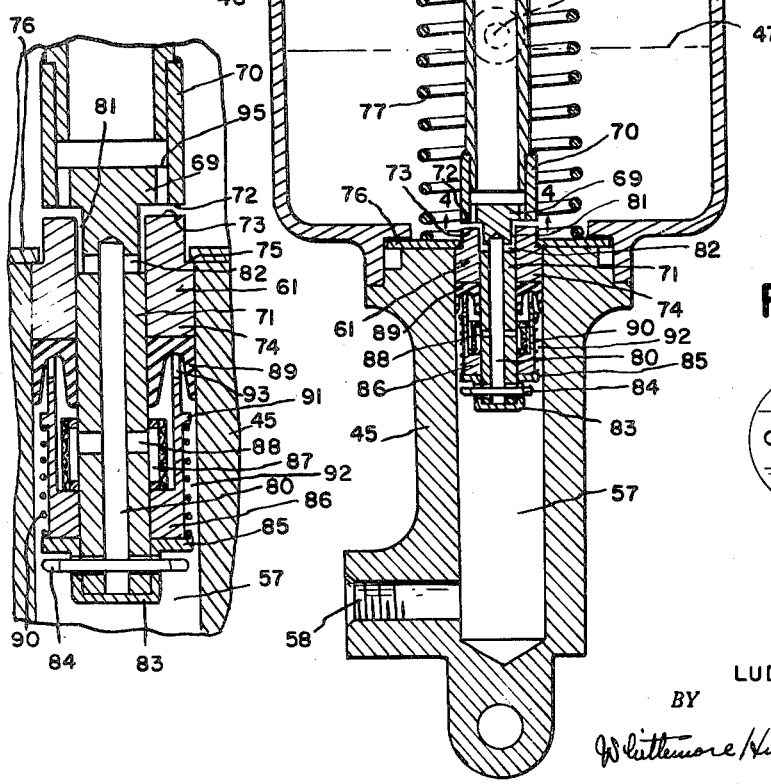
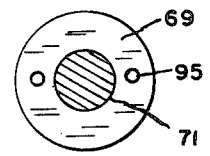
INVENTOR.
LUDWIG A. MAJNERI
BY
Whittemore Hulbert & Belknap
ATTORNEYS Patented Aug. 2, 1949

2,477,758

UNITED STATES PATENT OFFICE 2,477,758

MASTER CYLINDER FOR HYDRAULIC
BRAKE SYSTEMS

Ludwig A. Majneri, Grosse Pointe, Mich., assignor to The Warner Aircraft Corporation, Detroit, Mich., a corporation of Michigan Application May 21, 1945, Serial No. 594,942

5 Claims. (Cl. 60—54.6)

1

This invention relates to hydraulic braking systems and refers more particularly to an improved type of control unit for use in connection with hydraulic braking systems.

One of the principal objects of this invention is to provide hydraulic braking equipment embodying a control unit having a reservoir for hydraulic fluid medium and having a master cylinder characterized in that it is capable of serving a plurality of brake applying wheel cylinders.

A control unit embodying the above features may be successfully used in a hydraulic brake installation where one brake assembly is equipped with a brake having a main brake applying unit comprising one or more brake actuating wheel cylinders operated by an energizing unit also embodying a brake actuating cylinder. In accordance with this invention, the cylinders of both units are independently connected to a single control unit constructed to maintain the optimum fluid requirements in both units under practically all operating conditions and having means for closing communication to the cylinders in the main brake applying unit before the control unit functions to displace fluid in the energizing unit.

The foregoing as well as other objects will be made more apparent as this description proceeds, especially when considered in connection with the accompanying drawings, wherein:

Figure 1 is a semi-diagrammatic sectional view of a hydraulic brake assembly embodying a control unit constructed in accordance with this invention;

Figure 2 is a fragmentary sectional view showing the brake assembly in connection with a ground engaging wheel;

Figure 3 is a longitudinal sectional view through the control unit shown in Figure 1;

Figure 4 is a cross-sectional view taken substantially on the plane indicated by the line 4—4 of Figure 3; and Figure 5 is an enlarged sectional view of a part of the control unit.

Upon reference to Figures 1 to 4 inclusive, it will be noted that the reference character 10 indicates a ground engaging wheel, 11 indicates a hydraulic brake assembly and 12 designates a control unit. The ground engaging wheel 10 is of conventional construction and is supported in the usual manner on an axle 13 for rotation about the axis of the axle. As shown particularly in Figure 2 of the drawings, the wheel 10 is provided with a tire carrying rim 14 having an inwardly extending annular portion 15, concentrically disposed with respect to the axis of rotation

2 of the wheel and formed with circumferentially spaced axially extending splines 16 for slidably supporting a ring 17. The periphery of the ring 17 is formed with correspondingly circumferentially spaced axially extending grooves 18 for respectively slidably receiving the splines 16. As a result, the ring 17 rotates as a unit with the wheel 10 and is capable of sliding movement in opposite directions axially of the wheel.

Secured to the axle 13 at the inner side of the wheel 10 is a main brake applying unit embodying a supporting member 19 having a radially outwardly extending flange 20 positioned at the axially outer side of the ring 17 and having a suitable brake lining material 21 secured to the axially inner side thereof for frictional engagement with the adjacent surface of the ring 17. The supporting member 19 is further provided with a plurality of wheel cylinders 22 at the axially inner side of the ring 17. The number of wheel cylinders 22 may vary in accordance with design considerations but, in the present instance, three cylinders are selected for the purpose of illustrating the invention. As shown particularly in Figure 1 of the drawings, the center cylinder communicates with the adjacent cylinders through the medium of ports 23 and each cylinder has a piston 24 slidably supported therein in the manner shown in Figure 2 of the drawings. A friction disc 25 is secured to the axially outer surface of the head of each piston 24 for frictional engagement with the ring 17 upon movement of the pistons in an axial outward direction. As the friction discs 25 contact the ring 17 in response to axially outward movement of the pistons 24, the ring 17 is moved in a corresponding direction into frictional contact with the friction member 21 to apply the brake.

Hydraulic fluid medium under pressure is admitted to the cylinders 22 to operate the pistons 24 by an energizing unit 26. The energizing unit 26 comprises a bracket 27 having an annular portion 28 journalled on the axle 13 for rocking movement and having a wheel cylinder 29 for slidably supporting a piston 30. The piston 30 is supported on the same side of the ring 17 as the pistons 24 and has a friction disc 25' secured to the head thereof for engagement with the ring 17. The ring 17 is moved axially outwardly by the piston 30 into contact with a friction member 21' suitably fixed to an adjacent portion of the bracket 27. Inasmuch as the ring 17 rotates as a unit with the wheel 10, it follows that operation of the piston 30 to apply the brake imparts a rocking movement to the bracket 27 in one direction or the other depending upon the direction of rotation of the wheel. This rocking movement of the bracket 27 serves to apply the main brake actuating unit comprising the wheel cylinders 22. In detail, it will be noted from Figure 1 of the drawings that the member 19 is formed with a pair of cylinders 31 and 32 respectively positioned at diametrically opposite sides of the axis of rotation of the wheel. The upper end of the cylinder 31 communicates with one of the end cylinders 22 through a passage 33 and the upper end of the cylinder 32 communicates with the other end cylinder 22 through a passage 34. Pistons 35 and 36 are respectively slidably supported in the cylinders 31 and 32. The piston 35 is provided with a rod 37 which projects through the lower end of the cylinder 31 and supports a roller 38 for engagement with a cam 39 projecting laterally from the bracket 27. The piston 36 is provided with a similar rod 40 having a roller 41 at the lower end for engagement with a cam 42, which projects from the bracket 27 in a direction opposite the direction of extension of the cam 39.

Assuming that the main brake applying unit, including the cylinders 31 and 32, is filled with a hydraulic fluid medium, it will be noted that displacement of fluid in the energizing cylinder 29 applies the brake friction members to the ring 17 and imparts a rocking movement to the bracket 27. Assuming also that the direction of rotation is indicated by the arrow 43 in Figure 1 of the drawings, it will be noted that the bracket 27 is moved in a corresponding direction. As a result, the cam 39 on the bracket 27 operates through the roller 38 and rod 37 to move the piston 35 upwardly in the cylinder 31. Fluid is thereby displaced in the cylinder 31 through the passage 33 to effect a displacement of the fluid in the main brake applying cylinders 22. Displacement of fluid in the main brake applying cylinders 22 urges the pistons 24 axially outwardly and engages the ring 17 with the friction members to apply the brake. On the other hand, if the wheel is rotating in the opposite direction, the energizing cylinder 29 operates the main brake applying cylinders by displacing hydraulic fluid medium in the cylinder 32. Thus, regardless of whether the wheel is rotating in a forward or reverse direction, the main brake actuating wheel cylinders are operated through the energizing unit 26.

The control unit 12 comprises a reservoir 44 for hydraulic fluid medium and a master cylinder 45. In the present instance, the reservoir and master cylinder are shown as a single unit, although it will be understood that the reservoir may be divorced from the master cylinder, if desired. As shown particularly in Figure 3 of the drawings, the reservoir 44 is of sufficient capacity to provide a space 46 above the normal level 47 of the hydraulic fluid medium to enable expansion of the fluid due to absorption of heat during brake application. It will also be noted that the reservoir is vented to the atmosphere and for accomplishing this result, a plug 48 is threaded in an opening 49 formed in the top wall of the reservoir. The plug 48 is formed with a passage 50 having a reduced end communicating with the atmosphere and having an enlarged end 51 communicating with the interior of the reservoir. The enlarged end is protected by a screen 52 having a cup-shaped retainer 53 secured to the top surface thereof and forming a support for a ball valve member 54. The diameter of the ball 54 is substantially less than the internal diameter of the enlarged portion 51 of the passage to normally enable free flow of air through the passage 50. However, the diameter of the ball is greater than the internal diameter of the reduced end portion of the passage so that, if for any reason, the reservoir is inverted, the ball 54 engages the annular shoulder 55 surrounding the reduced portion 50 of the passage to close the latter. The reservoir may also be filled through the opening 49 by removing the plug 48 and the level of the hydraulic fluid medium in the reservoir may be determined by providing an overflow passage 56.

The master cylinder 45 comprises a cylinder 57 having a port 58 at the lower end adapted to be connected to a port 59 in the energizing wheel cylinder 29 by a conduit 60. A combined piston and valve assembly 61 is slidably supported in the cylinder 57 and is connected to a manually operable control member 62 by means of a tube 63. The upper end of the tube 63 is threaded for connection to a fitting 64 having the upper end coupled to the control member 62 and having a port 65 communicating with the interior of the tube through a passage 66 in the fitting 64. The port 65 also communicates with one of the end cylinders 22 through the medium of a conduit 67 and a port 68 formed in the end cylinder 22.

The lower end of the tube 63 is closed by a cap 69 having an upwardly projecting cylindrical portion 70 telescopically engaging the lower end of the tube and welded, or otherwise permanently secured, to the latter. The cap 69 forms a part of the combined piston and valve assemblies 61 and is also provided with a downwardly extending portion 71 of reduced diameter. The reduced portion 71 forms an annular seat 72 on the cap 69, which is adapted to abut the top surface 73 of an annular piston 74. The piston 74 is slidably mounted on the reduced portion 71 of the cap 69 and the outer surface of the piston slidably engages the inner wall of the cylinder 57.

The upper end of the piston is reduced to form an annular shoulder 75 intermediate the ends of the piston and this shoulder is adapted to engage a stop 76 to limit upward movement of the piston in the cylinder 57. The stop 76 is in the form of a washer clamped in place between the reservoir and cylinder. The sleeve 63 is normally maintained in its uppermost position by means of a coil spring 77, which surrounds the sleeve in the reservoir 44. The upper end of the spring abuts a collar 78 permanently secured to the sleeve 63 and the lower end of the spring rests on the washer 76. Thus, it will be noted that the spring 77 normally urges the collar 78 against an annular shoulder 79 formed on the top wall of the reservoir 44. In this extended position of the tube 63, the surface 72 on the cap 69 and the surface 73 at the upper end of the piston 74 are spaced from each other to enable hydraulic fluid medium in the reservoir to flow therebetween into an axial passage 80 formed in the reduced portion 71 on the cap 69. In this connection it will be noted that the annular surface of the reduced portion 71 of the cap joining the radially extending surface 72 is reduced to cooperate with the adjacent surface of the piston 74 to form an axial passage 81. The passage 81 communicates with the passage 80 through the medium of ports 82 formed in the reduced portion 71.

The lower end of the passage 80 is closed by a cap 83 secured to the reduced portion 71 by means of a pin 84 and having a radially outwardly extending flange 85 which forms a seat for a sleeve 86. The sleeve 86 is slidably mounted on the reduced portion 71 of the cap 69 and is counter-bored to form with the reduced portion an annular chamber 87 which communicates with the passage 80 through a series of circumferentially spaced ports 88. The upper end of the sleeve 86 abuts a sealing ring 89 formed of a resilient material such as rubber, or some rubber substitute. The sealing ring 89 has a base portion which abuts the lower end of the annular piston 74 and is provided with downwardly extending annular flanges which respectively engage the outer surface of the reduced portion 71 on the cap 69 and the inner wall of the cylinder 57. The upper end of the sleeve is resiliently held in engagement with the base portion of the sealing ring 89 by means of a coil spring 90 which surrounds the sleeve 86 and is seated at the lower end on the radial flange 85 of the cap 83. The upper end of the coil spring abuts an annular shoulder 91 formed integral with the sleeve, and the strength of this spring is merely sufficient to prevent a fluttering action of the piston 74.

The diameter of the sleeve is less than the internal diameter of the cylinder to provide an annular passage 92, which communicates at the lower end with the cylinder and communicates at the upper end with the chamber 87 through slots 93 formed in the corresponding end of the sleeve 86.

Attention is now directed to the fact that the reservoir 44 communicates with the interior of the tube 63 through the medium of vertical ports 95. The ports 95 are formed in the upper end of the cap 69 and extend from the annular surface 72 on the cap to the interior of the tube 63. The arrangement is such that these ports are closed when the surfaces 72 and 73 are in contact. Accordingly, the above surfaces are preferably lapped to prevent any leakage between the same when they are in contact.

It follows from the foregoing that when the several parts of the control unit are in the relative positions shown in Figure 3, communication is established between the reservoir 44 and the main brake actuating cylinders 22. In this connection it will be observed that fluid from the reservoir is free to flow between the surfaces 72 and 73 through the ports 95 to the interior of the tube 63. Inasmuch as the upper end of the tube 63 communicates with the wheel cylinders 22, it follows that the latter have a direct communication with the interior of the reservoir. As a result, expansion and contraction of hydraulic fluid medium in the main brake applying unit is compensated for and this unit is maintained in a satisfactory operating condition at all times regardless of wide fluctuations in temperature. It will also be noted that fluid from the reservoir may pass between the surfaces 72 and 73 into the passage 80 through the ports 82. As previously stated, the passage 80 communicates with the chamber 87 through the ports 88 and the chamber 87 communicates with the lower portion of the cylinder 57. Inasmuch as the lower end of the cylinder 57 communicates with the energizing wheel cylinder 29, it follows that expansion and contraction of hydraulic fluid medium in the energizing unit is also compensated for.

Assuming now that it is desired to apply the brake, the operator merely moves the control member 62 downwardly to effect a corresponding movement of the fitting 64 and associated tube 63. Initial downward movement of the tube 63 against the action of the spring 77 engages the annular surface 72 with the annular surface 73 on the upper end of the piston 74 and thereby effectively closes the ports 95 as well as the passage 81. Thus, communication between the wheel cylinders of both units is not only closed but, in addition, communication between the reservoir and the wheel cylinders of both units is also closed. Continued downward movement of the tube 63 imparts a corresponding downward movement to the combined piston and valve assembly 61. As a result, hydraulic fluid medium in the lower portion of the cylinder 57 is displaced, effecting a corresponding displacement of the fluid in energizing wheel cylinder 29. This cylinder applies the brake friction means to the ring 17 and the resulting torque rocks the bracket 27 about the axis of the axle 13 in one direction or the other, depending upon the direction of wheel rotation. Regardless of the direction of rotation of the wheel, the main brake applying unit is actuated by the energizing wheel cylinder to apply the brake in the manner clearly described in connection with the brake assembly.

What I claim as my invention is:

1. Hydraulic operating mechanism comprising a control unit having a reservoir and a master cylinder, said master cylinder having a cylinder provided with a discharge port and having a piston slidably supported in the cylinder, a member for operating the piston extending into the master cylinder and forming a support on which the piston is also slidably mounted, an annular shoulder on said member providing an annular surface cooperating with a corresponding annular surface on the piston to move the latter in a direction to displace hydraulic fluid medium in the master cylinder through said port, spring means for normally relatively positioning the member and piston with said annular faces spaced from each other to provide an annular passage therebetween which communicates with the reservoir, a passage in said member establishing communication between the annular passage and discharge port in the master cylinder, a second passage in the member communicating with a second discharge port and communicating with the annular passage through a port in said annular shoulder, said first and second passages being closed upon movement of the member against the action of the spring means to engage the coacting annular surfaces aforesaid.

2. Hydraulic operating mechanism comprising a master cylinder having a cylinder open at one end and having a discharge port adjacent the opposite end, an operating member extending into the cylinder through the open end thereof and having a passage therein communicating with a second discharge port, a piston assembly mounted on the operating member for limited sliding movement relative to the latter and also slidably engaging the cylinder, a reservoir for hydraulic fluid medium surrounding the member above the cylinder, an annular shoulder on the member having a flat annular face cooperating with a flat annular face on the adjacent end of the piston to move the latter in a direction toward the first named discharge port in said cylinder to displace fluid through the latter, spring means for normally relatively positioning the member and piston with the annular surfaces spaced sufficiently from each other to form an annular passage which communicates with the reservoir, a passage connecting the radially inner side of the annular passage to the first named discharge port in said cylinder and a passage extending from the annular face on said shoulder to the passage in said member whereby both discharge ports are connected to the reservoir, said passages being closed to the reservoir upon movement of the member to engage the annular surface on the latter with the adjacent annular surface on the piston.

3. Hydraulic operating mechanism comprising a master cylinder having a cylinder open at one end and having a discharge port adjacent the opposite end through which fluid is discharged to a point of demand, a reservoir for hydraulic fluid medium communicating with the open end of the cylinder, a piston slidable in the cylinder between the reservoir and discharge port, an operating member for the piston connected to the latter for limited sliding movement relative thereto and having a second discharge port through which fluid may also flow to a point of demand, a passage through the piston for connecting the reservoir to the first discharge port, a second passage through the operating member for connecting the reservoir to the second discharge port, cooperating means on said member and piston engageable with one another upon initial movement of the operating member on its pressure stroke to close said passages and to move said piston in a direction toward the first-named discharge port, and means including a spring for urging the member and piston to their inoperative positions and for normally maintaining said cooperating engaging means in spaced relationship.

4. Hydraulic operating mechanism comprising a master cylinder having a cylinder open at one end and having a discharge port adjacent the opposite end through which fluid is discharged to a point of demand, a reservoir for hydraulic fluid medium communicating with the open end of the cylinder, a piston slidable in the cylinder between the reservoir and discharge port, an operating member for the piston having a second discharge port through which fluid may flow to a point of demand and having a passage establishing communication between the second discharge port and reservoir, a passage through the piston for connecting the reservoir to the first named discharge port, and means responsive to initial movement of said member on its compression stroke to close said passages.

5. Hydraulic operating mechanism comprising a master cylinder having a vertical cylinder open at the top and having a discharge port adjacent the lower end thereof, a reservoir at the upper end of the cylinder communicating with the latter and adapted to contain a hydraulic fluid medium, a piston slidable in the cylinder between the reservoir and discharge port, an operating member extending from the piston through the reservoir and having a second discharge port spaced above the reservoir, a passage in the operating member for connecting the second discharge port to the reservoir, a passage through the piston for connecting the first discharge port to the reservoir, spring means normally urging the piston and operating member to their respective inoperative positions, and means for connecting said passages to the reservoir in the inoperative positions aforesaid of the piston and member and responsive to initial movement of the member on its compression stroke to close said passages.

LUDWIG A. MAJNERI.

REFERENCES CITED

The following references are of record in the file of this patent:

UNITED STATES PATENTS

| Number | Name | Date |
| --- | --- | --- |
| 2,115,230 | Oliver | Apr. 26, 1938 |
| 2,289,525 | Swift | July 14, 1942 |